United States Patent [19]

Ament et al.

[11] Patent Number: 5,230,415
[45] Date of Patent: Jul. 27, 1993

[54] CLUTCH PLATE FOR A MOTOR VEHICLE FRICTION CLUTCH

[75] Inventors: Norbert Ament, Werneck; Harald Raab, Schweinfurt, both of Fed. Rep. of Germany

[73] Assignee: Fichtel & Sachs AG, Schweinfurt, Fed. Rep. of Germany

[21] Appl. No.: 977,818

[22] Filed: Nov. 17, 1992

[30] Foreign Application Priority Data

Nov. 23, 1991 [DE] Fed. Rep. of Germany ....... 9114585

[51] Int. Cl.⁵ ............................................. F16D 3/66
[52] U.S. Cl. .................................... 192/106.2; 464/68
[58] Field of Search ................... 192/106.2; 464/63, 68

[56] References Cited

U.S. PATENT DOCUMENTS

| | | | |
|---|---|---|---|
| 4,453,838 | 6/1984 | Loizeau | 192/106.2 X |
| 4,635,780 | 1/1987 | Wiggen | 192/106.2 |
| 4,763,767 | 8/1988 | Lanzarini et al. | 192/106.2 |
| 4,889,218 | 12/1989 | Chasseguet et al. | 464/68 X |
| 4,890,712 | 1/1990 | Maucher et al. | 192/106.2 |
| 4,899,862 | 2/1990 | Graton et al. | 192/106.2 |
| 4,998,608 | 3/1991 | Raab et al. | 192/106.2 |
| 5,000,304 | 3/1991 | Köck et al. | 192/106.2 |
| 5,014,842 | 5/1991 | Graton et al. | 192/106.2 |
| 5,016,744 | 5/1991 | Fischer et al. | 192/106.2 |
| 5,064,041 | 11/1991 | Graton et al. | 192/106.2 |
| 5,117,959 | 6/1992 | Graton | 192/106.2 |
| 5,145,463 | 9/1992 | Bacher et al. | 464/63 |
| 5,169,357 | 12/1992 | Graton | 464/68 |

FOREIGN PATENT DOCUMENTS

| | | | |
|---|---|---|---|
| 2642804 | 8/1990 | France | 192/106.2 |
| 63-9729 | 1/1988 | Japan | 192/106.2 |

Primary Examiner—Rodney H. Bonck
Assistant Examiner—Andrea Pitts
Attorney, Agent, or Firm—Brumbaugh, Graves, Donohue & Raymond

[57] ABSTRACT

In order to mount the lateral discs of a clutch plate, provided with a torsional vibration damper, of a motor vehicle friction clutch on a hub, there is provided a plastic ring (23) which is inserted with an annular part (29) into a central opening in one of the lateral discs. The plastics ring (23) has a plurality of sets of radially inwardly projecting blocks (41, 43, 45), separated from one another by slots (46), with a cylindrical segment-shaped internal contour (47). The blocks (41) of a first set are radially resilient and define an internal diameter (D1) such that these blocks can rest without radial pretension on the external contour of the hub. The blocks (43) of a second set pass into the noses (33) provided to prevent rotation and, like the blocks (45) of a third set, are not resilient. The blocks (43, 45) of the second and third set define internal diameters (D1, D3) which are greater than the internal diameter (D1) of the first set, the internal diameter (D3) of the third set being smaller than the internal diameter (D2) of the second set. The blocks (45) of the third set rest via the annular part (29) directly on the central opening of the lateral disc and restrict the spring travel of the radially resilient blocks (41) of the first set. The blocks (43) of the second set which are not directly radially supported owing to radial tolerances of the lateral discs in the region of the noses (33) are therefore used to restrict the spring travel of the blocks (41) of the first set only after the blocks (45) of the third set are worn.

3 Claims, 2 Drawing Sheets

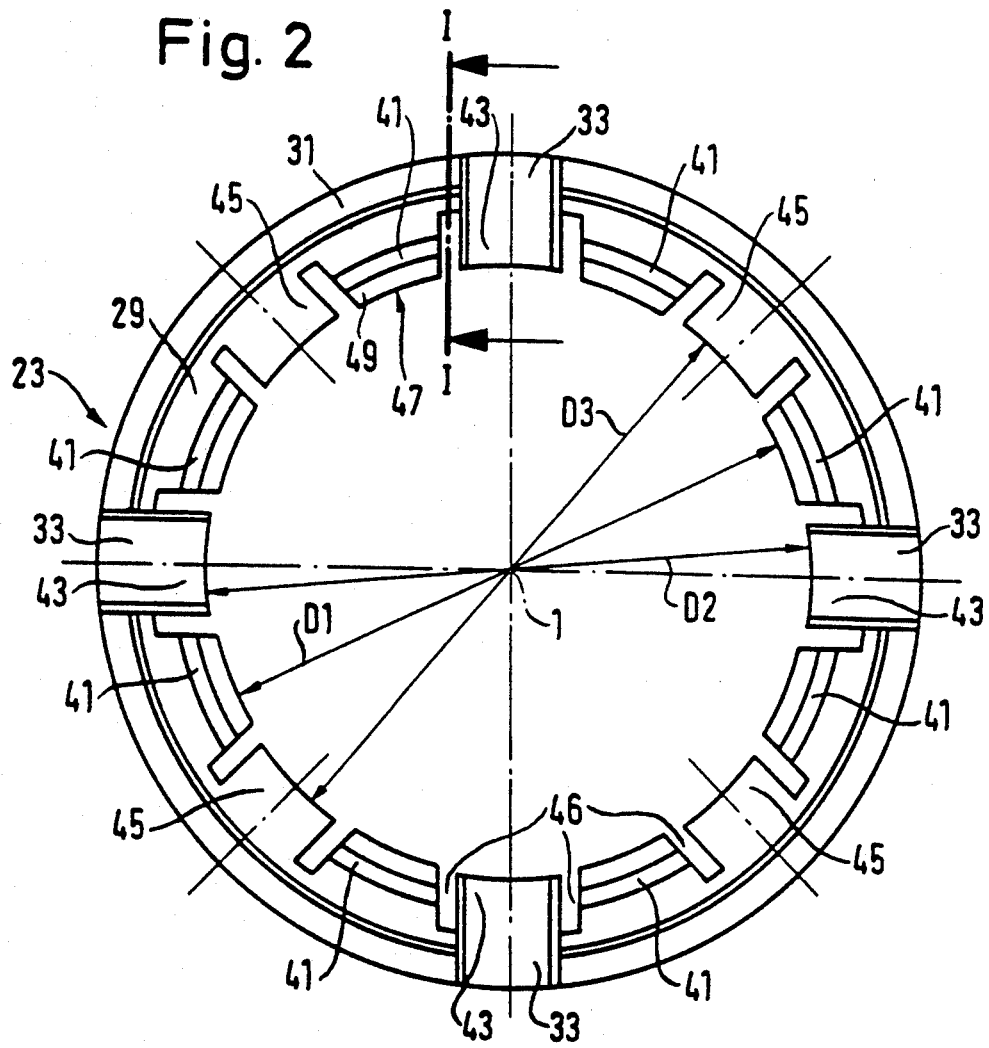

CLUTCH PLATE FOR A MOTOR VEHICLE FRICTION CLUTCH

BACKGROUND OF THE INVENTION

The invention relates to a clutch plate for a motor vehicle friction clutch, and in particular a clutch plate with a torsional vibration damper.

A clutch plate for a motor vehicle friction clutch is known from DE-A-39 21 283 (U.S. Pat. No. 5,016,744) in which two lateral discs rigidly connected to one another are arranged on a hub on either side of a hub disc non-rotatably connected to the hub, the lateral discs being torsionally elastically connected to the hub disc via springs. The lateral discs carry the friction linings of the clutch plate in the conventional manner. One of the two lateral discs is rotatably mounted on a circular cylindrical external face of the hub via a plastic ring. The plastic ring has an annularly closed annular part with which it is inserted into a central opening of the lateral disc. A web part projecting radially outwardly from the annular part fixes the plastic ring axially on the lateral disc.

A plurality of blocks project radially inwardly from the annular part and are separated from one another by radially inwardly issuing radial slots. The blocks end radially opposite the circular cylindrical external face of the hub with a cylindrical segment-shaped internal contour. Whereas the blocks of a first set are radially resilient in design and define an internal diameter allowing their internal contour to rest without radial initial tension on the external contour of the hub, the blocks of a second set are radially non-resilient in design. The blocks of the second set define a greater internal diameter and form radial stops which limit the spring travel of the blocks of the first set.

The blocks of the second set continue radially outwardly beyond the annular part as noses which engage in radial recesses of the central opening of the lateral disc to prevent rotation of the plastic ring. To guarantee a non-rotatable fixing of this type, the peripherally located edges of the recesses have to be produced accurately with low tolerances. However, the radial boundary of the recesses has relatively great tolerances. In operation, this means that the non-resilient blocks of the second set can yield radially outwardly at least in part when the radial spring travel of the blocks of the first set is used up. This makes it difficult to limit the spring travel exactly and can damage the plastics ring.

SUMMARY OF THE INVENTION

The invention improves the above-described plastic ring of a clutch plate so as to guarantee reliable restriction of the spring travel without the plastic ring being mechanically over-stressed or the production tolerances of the recesses in the central opening of the lateral disc having to be altered.

The invention is based on a clutch plate for a motor vehicle friction clutch, comprising:

a hub concentric to an axis of rotation a hub disc non-rotatably connected to the hub lateral discs which are arranged axially on either side of the hub disc, are rigidly connected to one another, are rotatable relative to the hub disc, are torsionally elastically coupled to the hub disc by means of springs and of which one lateral disc has a central opening with which this lateral disc surrounds a circular cylindrical external face of the hub, a plastic ring, radially guiding said one lateral disc on the hub, with an annularly closed annular part inserted into the central opening of said one lateral disc, with a web part which projects radially outwardly from the annular part and forms an axial stop resting on said one lateral disc, with at least one nose which projects radially outwardl.y from the annular part and engages in a radial recess of the central opening to prevent rotation and with a plurality of sets of peripherally distributed blocks which are separated from one another by radial slots, project radially inwardly from the annular part and each have a cylindrical segment-shaped internal contour radially adjacent to the circular cylindrical external contour of the hub, wherein the blocks of a first set are radially resilient in design and each have a web which forms the cylindrical segment-shaped internal contour and extends substantially in the direction of the axis of rotation, is connected via a connecting region to an axial edge region of the annular part and rests with the cylindrical segment-shaped internal contour without radial pretension on the circular cylindrical external contour of the hub, and wherein the blocks of a second set are radially non-resilient in design and extend radially outwardly beyond the annular part to form the nose, wherein the internal contour of the blocks of the second set define a greater internal diameter than the blocks of the first set.

The improvement resides in the fact that the blocks of a third set are also radially non-resilient in design and the internal contour of the blocks of the third set define an internal diameter which is greater than the internal diameter defined by the internal contour of the blocks of the first set but smaller than the internal diameter defined by the internal contour of the blocks of the second set.

In contrast to the blocks of the second set which pass into the noses, the blocks of the third set rest directly on the central opening of the lateral disc and cannot therefore escape. The blocks of the third set restrict the radial spring travel and are not used to prevent rotation as the blocks of the second set. The blocks of the second set possibly additionally come into contact with the hub if the blocks of the third set are so worn after prolonged operation that their internal diameter coincides with that of the second set of blocks. From this moment, all non-resilient blocks participate in the restriction of the spring travel.

In a preferred design, a block from the second or third set follows each block of the first set alternately. This ensures that a radially non-resilient block of the second or third set follows on either side of each radially resilient block of the first set. A uniform distribution of this type results in balanced force distribution on both the resilient and the non-resilient blocks.

The first set preferably comprises eight blocks while the second and third set each have four blocks. The resultant distribution of the blocks in the peripheral direction guarantees that the load arising between the hub and the lateral disc is uniformly distributed on the plastic ring. Local overstressing is therefore ruled out.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 2 is an axial section of the plastic ring as viewed from the exterior of the clutch plate.

DESCRIPTION OF PREFERRED EMBODIMENTS

Figure 1:
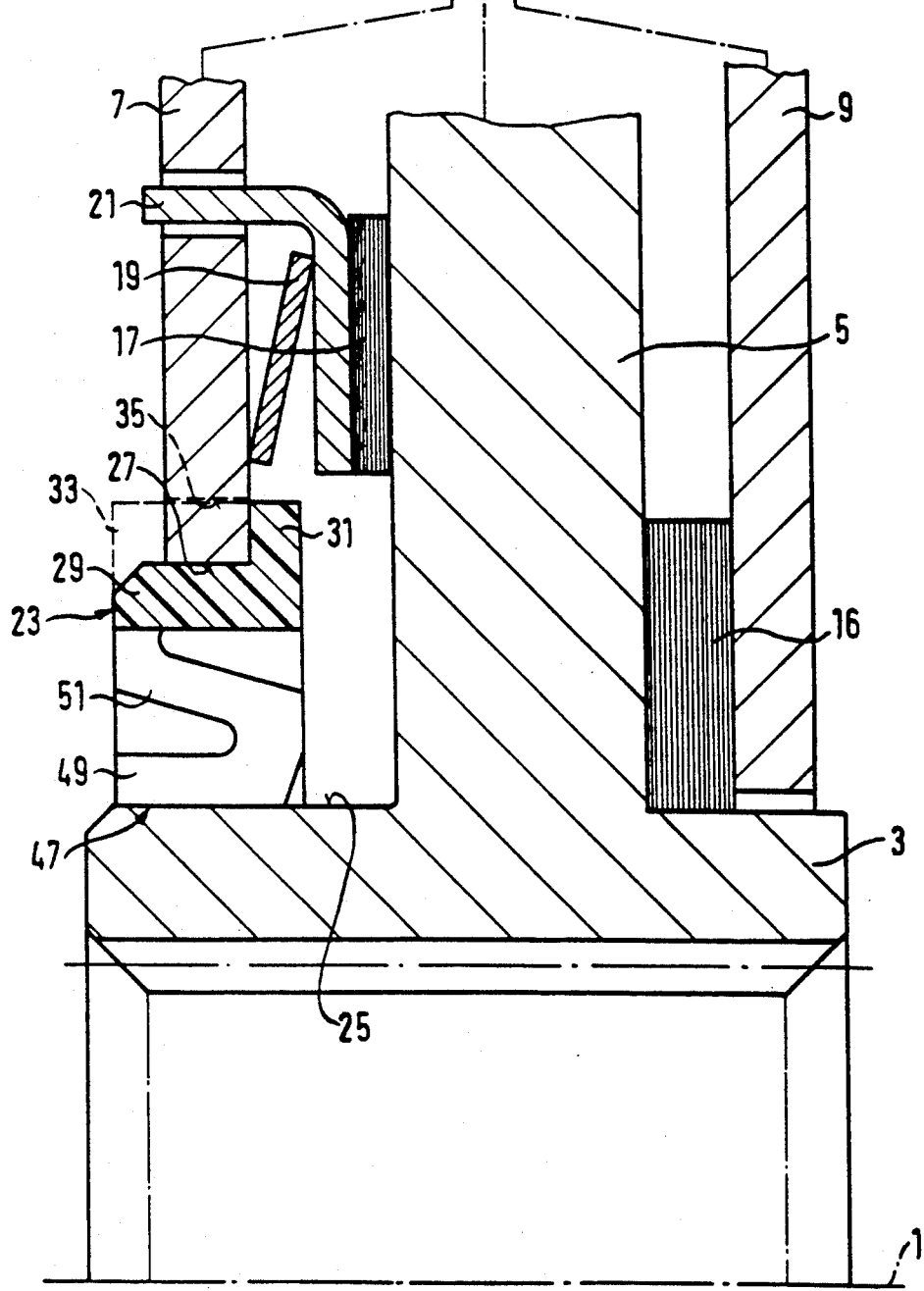
FIG. 1 is an axial longitudinal section through a part of a clutch plate, partially in schematic form, as viewed along a section line I—I of a plastic ring of the clutch plate from FIG. 2.

The clutch plate shown in part in FIG. 1 of a motor vehicle friction clutch comprises a hub 3 which is concentric to an axis of rotation 1 and from which a hub disc 5 projects radially. As illustrated, the hub disc 5 can be integrally connected to the hub 3, however it can also be coupled in the conventional manner via teeth with a certain rotary play but otherwise non-rotatably to the hub 3. Two covering plates or lateral discs 7, 9 are rotatably arranged coaxially to the hub 3 axially on either side of the hub disc 5. As indicated schematically at 11 in FIG. 1, the lateral discs 7, 9 are rigidly connected to one another, for example by rivets, and carry friction linings 13 of the clutch plate. Peripherally distributed springs 15 couple the lateral discs 7, 9 torsionally elastically to the hub disc 5. Between the hub disc 5 and the lateral discs 7, 9 there are provided friction devices which, in the embodiment illustrated, comprise a friction ring 16 arranged between the hub disc 5 and the lateral disc 9, a friction ring 17 arranged between the hub disc 5 and the lateral disc 7 and a Belleville spring washer 19 which is fixed axially between the friction ring 17 nd the lateral disc 7 and rests on the friction ring 17 via a thrust ring 21 non-rotatably connected to the lateral disc 7.

Figure 3:
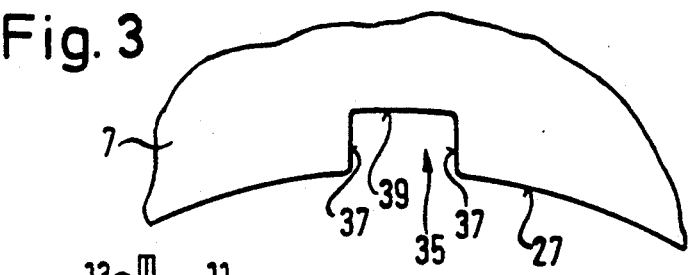
FIG. 3 is a lateral view of a detail of a lateral disc of the clutch plate.

The unit comprising the lateral discs 7, 9 is guided radially on a circular cylindrical external contour 25 of the hub 3 by a plastic ring 23. The plastics ring 23 is inserted into a central opening 27 in one of the two lateral discs, the lateral disc 7 in this case, and, as shown most clearly in FIG. 2, has an annularly closed annular part 29 which is inserted into the central opening 27 of the lateral disc 7 and, at an axial end region, has a radially outwardly projecting web part 31 which forms axial st resting on the lateral disc 7. Peripherally distributed noses 33 project radially outwardly from the annular part 29, engage in radial recesses 35 (FIG. 3) on the margin of the central opening 27 and prevent rotation of the plastic ring 23 on the lateral disc 7. The peripherally located edges 37 of the recess 35 enclose the noses 33 with small tolerances. The radial margin 39 of the recess 35, on the other hand is produced with comparatively great tolerances.

Three sets of blocks 41, 43 and 45 project radially inwardly from the annular part 29 to the circular cylindrical contour 25 of the hub 3. All blocks 41, 43 and 45 have a circular segment-shaped cylindrical internal contour, the internal contours of the various sets of blocks defining different internal diameters, as described in detail hereinafter. The peripherally succeeding blocks 41, 43, 45 are separated by slots 46, issuing radially inwardly, and each rest with a segment 47 of a circular cylindrical internal contour radially opposite the circular cylindrical external contour 25 of the hub 3.

The blocks 41 of a first set are radially resilient in design and, as shown most clearly in FIG. 1, have a web 49 which extends in the direction of the axis of rotation 1 and is connected to one of the axial edge regions of the annular part 29 via an obliquely extending connecting region 51. The internal diameter D1 (FIG. 2) defined by the internal contour of the blocks 41 is dimensioned such that the blocks 41 rest without radial prestress on the external contour 25 of the hub 3.

The blocks 43 of a second set are non-resilient in design and continue integrally in each case into one of the noses 33 provided on the exterior of the annular part 29 to prevent rotation. The blocks 45 of the third set are also non-resilient in design and, in contrast to the blocks 43 which have no direct radial support on the lateral disc 7 owing to the radial tolerances of the noses 33 in the recesses 35, rest directly on the edge of the central opening 27 via the annular part 29. The internal diameter D3, defined by the internal contour of the blocks 45 of the third set, is greater than the internal diameter D1 of the blocks 41, and the blocks 45 form radial stops to restrict the spring travel of the radially resilient blocks 41. The internal diameter D2, defined by the internal contour of the blocks 43, is greater than the internal diameter D1 of the blocks 41 and also greater than the internal diameter D3 of the blocks 45. This ensures that the hub 3 initially rests on the non-resilient blocks 45 with its cylindrical external contour 25 when the spring travel of the blocks 41 is used up. The blocks 43 can only serve to restrict spring travel after prolonged operation if the blocks 45 are worn and the internal diameter D3 has therefore become equal to the internal diameter D2. A certain amount of wear of the plastic ring can therefore be permitted without impairing its usefulness. The radial movability is invariably ensured without the plastics ring 23 being overstressed anywhere.

In the embodiment illustrated, a block 43 of the second set or a block 45 of the third set follows a radially resilient block 41 alternately. A block 43 of the second set is therefore found on one side and a block 45 of the third set on the other side in the peripheral direction on either side of each block 41. The radial forces acting on the plastic ring 23 are therefore distributed particularly uniformly over the entire service life thereof. Eight blocks 41 as well as four respective blocks 43 and 45 are distributed in the above-mentioned manner in the embodiment illustrated.

While specific embodiments of the invention have been shown and described in detail to illustrate the application of the inventive principles, it will be understood that the invention may be embodied otherwise without departing from such principles.

What we claim is:

1. A clutch plate for a motor vehicle friction clutch, comprising:

a hub (3) concentric to an axis of rotation (1)

a hub disc (5) non-rotatably connected to the hub (3)

lateral discs (7, 9) which are arranged axially on either side of the hub disc (5), are rigidly connected to one another, are rotatable relative to the hub disc (5), are torsionally elastically coupled to the hub disc (5) by means of springs (15) and of which one lateral disc (7) has a central opening (27) with which this lateral disc (7) surrounds a circular cylindrical external face (25) of the hub (3), a plastic ring (23), radially guiding said one lateral disc (7) on the hub (3), with an annularly closed annular part (29) inserted into the central opening

(27) of said one lateral disc (7), with a web part (31) which projects radially outwardly from the annular part (29) and forms an axial stop resting on said one lateral disc (7), with at least one nose (33) which projects radially outwardly from the annular part (29) and engages in a radial recess (35) of the central opening (27) to prevent rotation and with a plurality of sets of peripherally distributed blocks (41, 43, 45) which are separated from one another by radial slots (46), project radially inwardly from the annular part (29) and each have a cylindrical segmentshaped internal contour (47) radially adjacent to the circular cylindrical external face (25) of the hub (3), wherein the blocks (41) of a first set are radially resilient in design and each have a web (49) which forms the cylindrical segment-shaped internal contour (47) and extends substantially in a direction of the axis of rotation (1), is connected via a connecting region (51) to an axial edge region of the annular part (29) and rests with the cylindrical segment-shaped internal contour (47) without radial prestress on the circular cylindrical external (25) of the hub (3), and wherein the blocks (43) of a second set are radially non-resilient in design and extend radially outwardly beyond the annular part (29) to form noses (33), wherein the internal contour of the blocks (43) of the second set define a greater internal diameter than the blocks (41) of the first set, wherein the blocks (45) of a third set are also radially non-resilient in design and the internal contour of the blocks (45) of the third set define an internal diameter which is greater than the internal diameter defined by the internal contour (47) of the blocks (41) of the first set but smaller than the internal diameter defined by the internal contour of the blocks (43) of the second set.

2. The clutch plate as in claim 1,
wherein, sequentially in a peripheral direction, each block (41) of the first set is followed by a block (43, 45) alternately of the second set and of the third set.

3. The clutch plate as in claim 2, wherein
the first set comprises eight blocks (41) and the second and third set each comprises four blocks (43, 45) each.

\* \* \* \* \*

UNITED STATES PATENT AND TRADEMARK OFFICE
CERTIFICATE OF CORRECTION

PATENT NO. : 5,230,415

DATED : July 27, 1993

INVENTOR(S) : Ament et al.

It is certified that error appears in the above-identified patent and that said Letters Patent is hereby corrected as shown below:

```
On the title page:     item [75], "Norbert Ament, Werneck" should
    read --Norbert Ament, Eltingshausen--;
Col. 3, line 42, "plastics ring" should read --plastic ring--;
Col. 3, line 49, "axial st" should read --an axial stop--;
Col. 5, line 12, "segmentshaped" should read --segment-shaped--;
Col. 5, line 23, "external (25)" should read --external face
    (25)";
Col. 6, line 22, "45) each." should read --45).--.
```

Signed and Sealed this

Twenty-ninth Day of March, 1994

Attest:

BRUCE LEHMAN

Attesting Officer     Commissioner of Patents and Trademarks